US008122013B1

(12) United States Patent
Qian et al.

(10) Patent No.: US 8,122,013 B1
(45) Date of Patent: Feb. 21, 2012

(54) TITLE BASED LOCAL SEARCH RANKING

(75) Inventors: Jiang Qian, Pittsburgh, PA (US); Ben Luk, San Francisco, CA (US); Xinghua An, Mountain View, CA (US)

(73) Assignee: Google Inc., Mountain View, CA (US)

( * ) Notice: Subject to any disclaimer, the term of this patent is extended or adjusted under 35 U.S.C. 154(b) by 346 days.

(21) Appl. No.: 11/340,857

(22) Filed: Jan. 27, 2006

(51) Int. Cl.
*G06F 17/30* (2006.01)

(52) U.S. Cl. ....................... 707/722; 707/758

(58) Field of Classification Search .................. 707/3, 4, 707/7, 722, 758
See application file for complete search history.

(56) References Cited

U.S. PATENT DOCUMENTS

| | | | | |
|---|---|---|---|---|
| 5,930,474 A * | 7/1999 | Dunworth et al. ............... 707/10 |
| 5,983,227 A | 11/1999 | Nazem et al. |
| 6,393,415 B1 * | 5/2002 | Getchius et al. .................. 707/2 |
| 6,523,021 B1 * | 2/2003 | Monberg et al. .................. 707/2 |
| 6,625,595 B1 | 9/2003 | Anderson et al. |
| 6,697,799 B1 | 2/2004 | Neal et al. |
| 6,778,980 B1 * | 8/2004 | Madan et al. ..................... 707/3 |
| 6,823,333 B2 * | 11/2004 | McGreevy ........................ 707/4 |
| 6,904,429 B2 * | 6/2005 | Sako et al. ........................ 707/3 |
| 7,043,492 B1 | 5/2006 | Neal et al. |
| 7,117,199 B2 | 10/2006 | Frank et al. |
| 7,185,088 B1 | 2/2007 | Joy et al. |
| 7,249,126 B1 * | 7/2007 | Ginsburg et al. ................. 707/3 |
| 2002/0129014 A1 | 9/2002 | Kim et al. |
| 2002/0156779 A1 | 10/2002 | Elliott et al. |
| 2003/0033299 A1 | 2/2003 | Sundaresan |
| 2003/0061211 A1 * | 3/2003 | Shultz et al. ...................... 707/3 |
| 2004/0243569 A1 * | 12/2004 | Burrows ........................... 707/3 |
| 2005/0015307 A1 * | 1/2005 | Simpson et al. ................ 705/26 |
| 2005/0060290 A1 | 3/2005 | Herscovici et al. |
| 2005/0065959 A1 | 3/2005 | Smith et al. .................... 707/102 |
| 2005/0080795 A1 * | 4/2005 | Kapur et al. .................. 707/100 |
| 2005/0091193 A1 | 4/2005 | Frank et al. |
| 2005/0108213 A1 * | 5/2005 | Riise et al. ........................ 707/3 |
| 2005/0182770 A1 | 8/2005 | Rasmussen et al. |
| 2005/0192946 A1 * | 9/2005 | Lu et al. ............................ 707/3 |
| 2005/0240580 A1 * | 10/2005 | Zamir et al. ...................... 707/4 |
| 2006/0106778 A1 * | 5/2006 | Baldwin ........................... 707/3 |
| 2006/0149734 A1 * | 7/2006 | Egnor et al. ...................... 707/7 |

(Continued)

FOREIGN PATENT DOCUMENTS

EP    1 359 519 A2    11/2003

(Continued)

OTHER PUBLICATIONS

U.S. Appl. No. 11/138,670, filed May 27, 2005, titled "Scoring Local Search Results Based on Location Prominence," Brian O'Clair et al., 34 pages.

(Continued)

*Primary Examiner* — Son T Hoang

(74) *Attorney, Agent, or Firm* — Harrity & Harrity, LLP

(57) ABSTRACT

A method for performing a local search includes receiving a local search request that includes at least a search term and a geographic identification. Business listings matching the received local search request are identified. The business listings are then ranked based on at least a webscore associated with each listing. Each listing's webscore is based on the listing's web popularity. In this manner, local search listings are ranked and presented in a more accurate manner.

23 Claims, 6 Drawing Sheets

U.S. PATENT DOCUMENTS

| | | | |
|---|---|---|---|
| 2006/0184523 | A1 | 8/2006 | Israel et al. |
| 2007/0276810 | A1* | 11/2007 | Rosen .............................. 707/3 |
| 2008/0086457 | A1* | 4/2008 | Fei et al. ........................... 707/3 |

FOREIGN PATENT DOCUMENTS

| | | |
|---|---|---|
| WO | WO 01/27805 A2 | 4/2001 |
| WO | WO 01/65410 A2 | 9/2001 |
| WO | WO 2005/024667 A1 | 3/2005 |
| WO | WO 2005/031613 A1 | 4/2005 |

OTHER PUBLICATIONS

Local Results Near Fairfax, VA 22030, http://search.msn.com/local/results.aspx?q=restaurant&w=Fairfax%2C+va+22030&FORM=QBXR pp. 1-2, printed on Apr. 27, 2006.

Yahoo! Local, Fairfax, http://local.yahoo.com/?csz=Fairfax%2C+VA+22030, pp. 1-2, printed on Apr. 27, 2006.

Final Office Action from U.S. Appl. No. 11/138,670, dated Nov. 19, 2007, 41 pages.

Non-final Office Action from U.S. Appl. No. 11/138,670 dated Apr. 21, 2008, 47 pages.

Final Office Action from U.S. Appl. No. 11/138,670 dated Oct. 28, 2008, 45 pages.

U.S. Appl. No. 11/139,032, filed May 27, 2005 entitled "Using Boundaries Associated with a Map View for Business Location Searching" by Brian O'Clair, 29 pages.

Office Action from U.S. Appl. No. 11/138,670, dated Jul. 11, 2007; 54 pages.

* cited by examiner

TITLE BASED LOCAL SEARCH RANKING

FIELD OF THE INVENTION

The present invention relates generally to document searching, and, more particularly, to systems and methods for enhancing local search performance.

DESCRIPTION OF RELATED ART

The World Wide Web ("web") contains a vast amount of information. Locating a desired portion of the information, however, can be challenging. This problem is compounded because the amount of information on the web and the number of new users inexperienced at web searching are growing rapidly.

Search systems attempt to return hyperlinks to web pages in which a user is interested. Generally, search systems base their determination of the user's interest on search terms (called a search query) entered by the user. The goal of the search system is to provide links to high quality, relevant results (e.g., web pages) to the user based on the search query. Typically, the search system accomplishes this by matching the terms in the search query to a corpus of pre-stored web pages. Web pages that contain the user's search terms are "hits" and are returned to the user as links.

Local search systems attempt to return relevant web pages and/or business listings within a specific geographic area. Unfortunately, basing search results strictly upon geographic information may not provide the most desirable search results.

SUMMARY OF THE INVENTION

According to one aspect consistent with principles of the invention, a method may include receiving a local search request including at least a search term and a geographic identification; identifying business listings matching the received local search request; determining a webscore associated with each identified business listing; and ranking the identified business listing based on the webscore associated with each identified business listing.

According to a further aspect, a system may include means for receiving a local search request including a search term and a geographic identification; means for identifying business listings matching the search term and an expanded geographic region including at least an area identified by the received geographic identification; means for calculating a location prominence score for each identified business listing; means for ranking the identified business listings based on the location prominence scores; and means for presenting the ranked business listings to a user.

According to a yet another aspect, a method may include determining a webscore for each of a plurality of business listings, wherein the webscore includes a number of web documents referencing a business listing title; receiving a local search request from a user via a computer network; identifying business listings based on the local search request; ranking the identified business listings based on the webscore for each listing; and presenting the ranked business listings to the user over the computer network.

According to still another aspect, a computer-readable medium that stores instructions executable by a client device is provided. The computer-readable medium may include instructions for receiving a local search request from a user, wherein the local search request includes a search term and a geographic identifier; instructions for identifying business listings based on the local search request; instructions for calculating a location prominence score for each identified business listing, wherein the location prominence score is based on a webscore for each identified business listing; instructions for ranking the identified business listings based on the location prominence scores; and instructions for presenting the ranked business listings to the user.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Overview

Local searching may involve identifying business listings associated with a particular geographic area. Some geographic areas may include a large number of business listings associated with a given query. For example, a search of "universities near New York" may result in a large number of listings. In addition, proximity-based search results may fail to provide potentially relevant or important search results in an initial result set, thereby adversely impacting the search's apparent success.

Systems and methods consistent with the principles of the invention may identify matching business listings within a defined geographic region and present the identified listings based, at least in part, upon webscores associated with the listings. As described in additional detail below, each listing's webscore is calculated to reflect the listing's popularity or importance within a larger data set, such as the Internet at large. In this manner, popular or important listings may be elevated above listings that have lower popularities.

Exemplary Network Configuration

Figure 1:
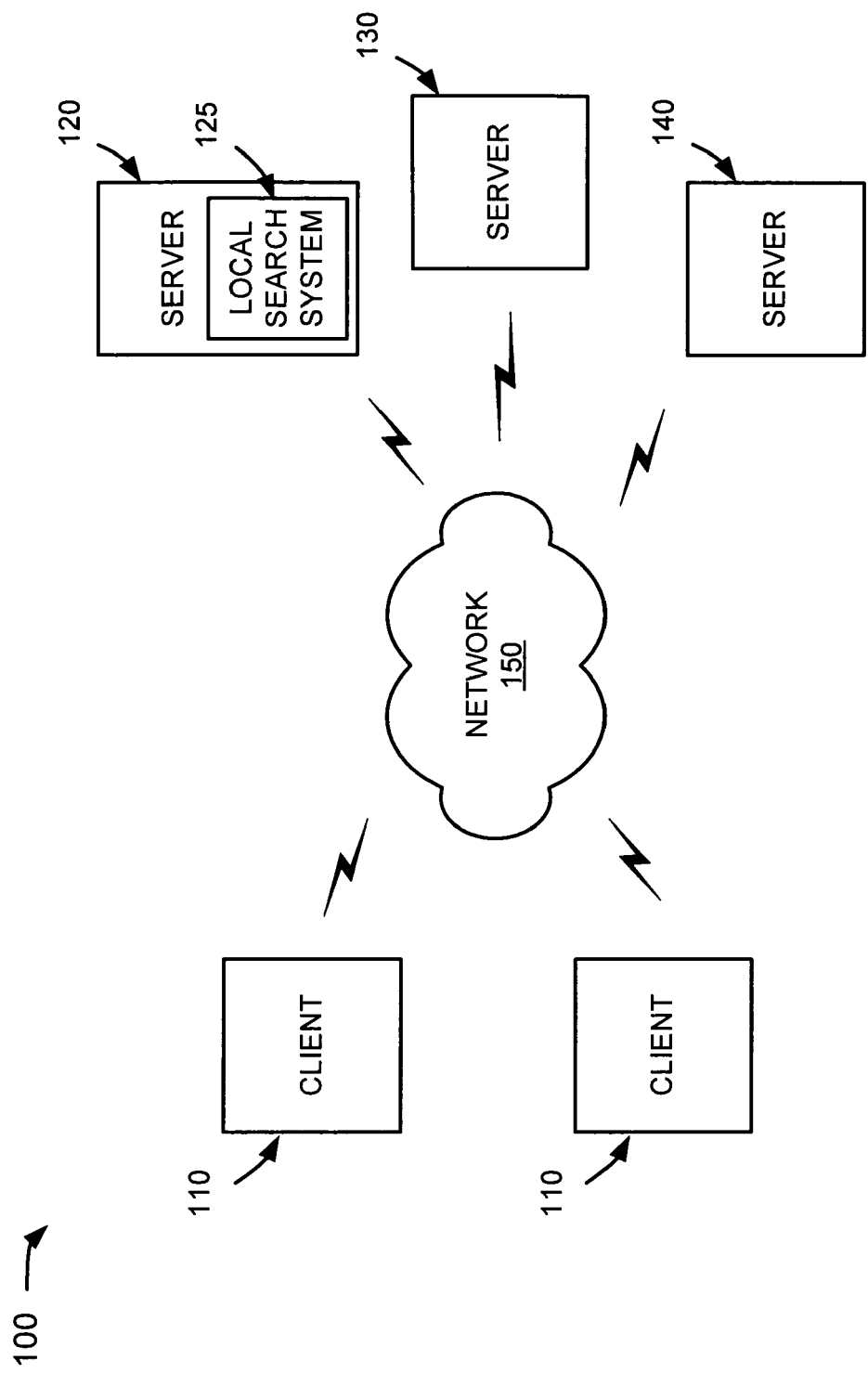
FIG. 1 is a diagram of an exemplary information retrieval network in which systems and methods consistent with principles of the invention may be implemented.

FIG. 1 is an exemplary diagram of a network 100 in which systems and methods consistent with principles of the invention may be implemented. Network 100 may include multiple clients 110 connected to multiple servers 120-140 via a network 150. Network 150 may include a local area network (LAN), a wide area network (WAN), a telephone network, such as the Public Switched Telephone Network (PSTN), an intranet, the Internet, a memory device, another type of network, or a combination of networks. Two clients 110 and three servers 120-140 have been illustrated as connected to network 150 for simplicity. In practice, there may be more or fewer clients and servers. Also, in some instances, a client may perform the functions of a server and a server may perform the functions of a client.

Clients 110 may include client entities. An entity may be defined as a device, such as a wireless telephone, a personal computer, a personal digital assistant (PDA), a lap top, or another type of computation or communication device, a thread or process running on one of these devices, and/or an object executable by one of these devices. Servers 120-140 may include server entities that gather, process, search, and/or maintain documents in a manner consistent with principles of the invention. Clients 110 and servers 120-140 may connect to network 150 via wired, wireless, and/or optical connections.

In an implementation consistent with principles of the invention, server 120 may optionally include a local search system 125 usable by clients 110. Server 120 may crawl documents (e.g., web pages) and store information associated with these documents in a repository of crawled documents. Local search system 125 may facilitate searching of collected or aggregated business listings in response to received search queries from clients 110. Identified listings may be sorted, ranked and presented in the manner set forth in detail below. Servers 130 and 140 may store or maintain documents that may be crawled by server 120. While servers 120-140 are shown as separate entities, it may be possible for one or more of servers 120-140 to perform one or more of the functions of another one or more of servers 120-140. For example, it may be possible that two or more of servers 120-140 are implemented as a single server. It may also be possible that a single one of servers 120-140 is implemented as multiple, possibly distributed, devices.

A "document," as the term is used herein, is to be broadly interpreted to include any machine-readable and machine-storable work product. A document may include, for example, an e-mail, a web site, a business listing, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Exemplary Client/Server Architecture

Figure 2:
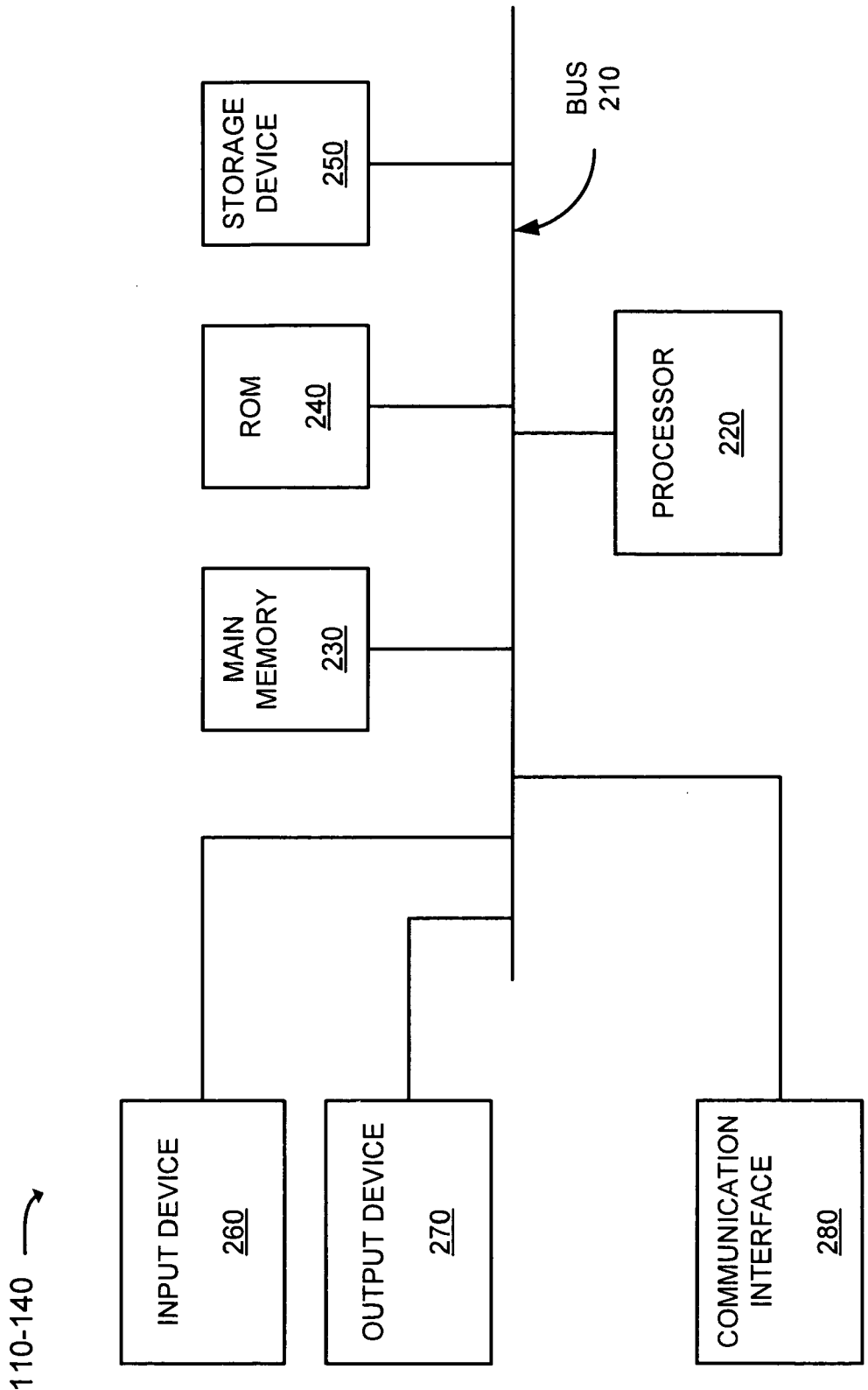
FIG. 2 is a diagram of an exemplary client or server of FIG. 1 according to an implementation consistent with principles of the invention.

FIG. 2 is an exemplary diagram of a client or server entity (hereinafter called "client/server entity"), which may correspond to one or more of clients 110 and/or servers 120-140, according to an implementation consistent with the principles of the invention. The client/server entity may include a bus 210, a processor 220, a main memory 230, a read only memory (ROM) 240, a storage device 250, an input device 260, an output device 270, and a communication interface 280. Bus 210 may include a path that permits communication among the elements of the client/server entity.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information to the client/server entity, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 150.

The client/server entity, consistent with the principles of the invention, may perform certain operations, as will be described in detail below. The client/server entity may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Local Search Processing

Figure 3:
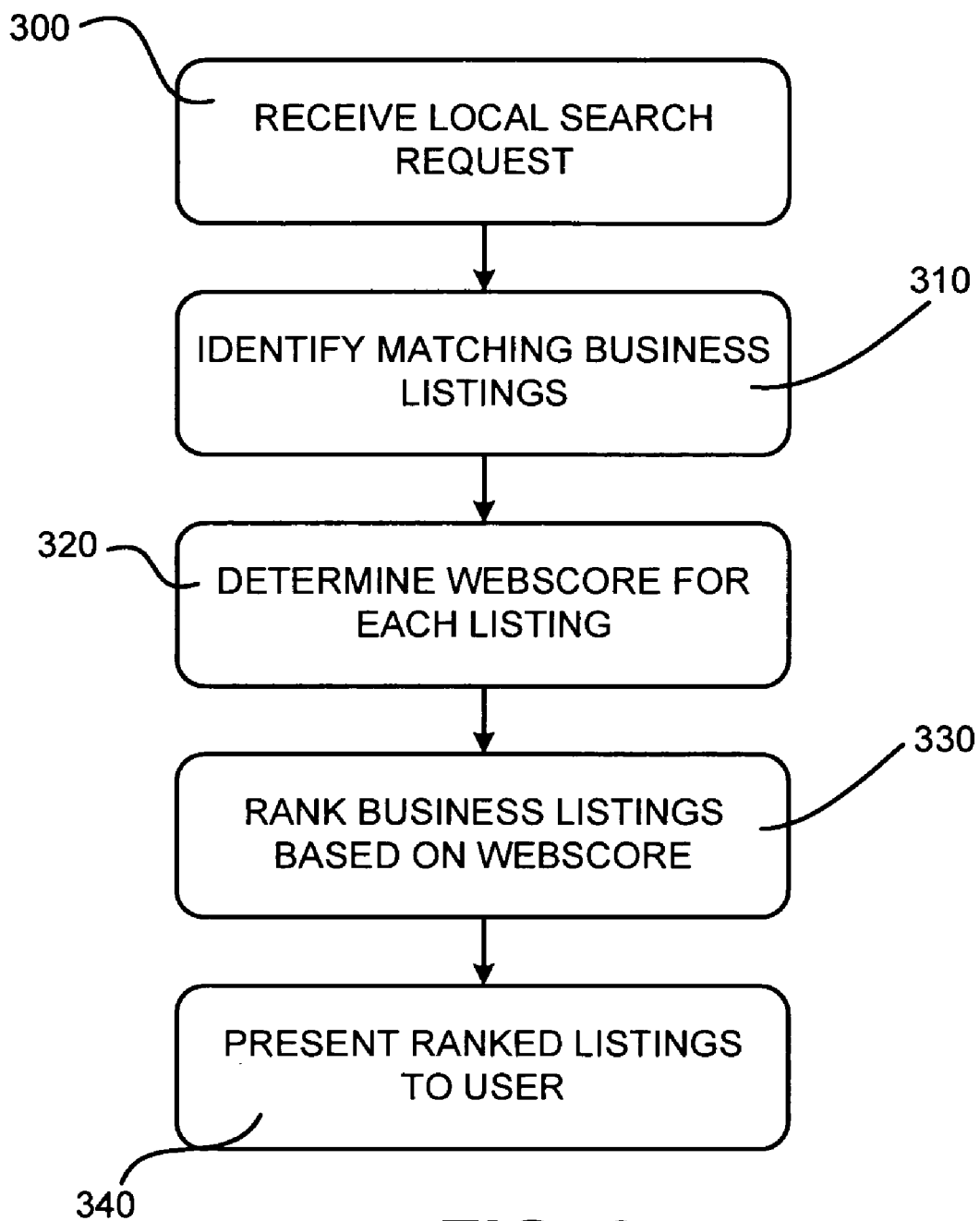
FIG. 3 is flow chart of exemplary processing for performing a local search according to an implementation consistent with principles of the invention.

FIG. 3 is a flow chart of exemplary processing for performing a local search. Initially, processing may begin by receiving a local search request from client device 110 at local search system 125 (block 300). In one implementation consistent with principles of the invention, the local search request may include one or more search terms and may specify a geographic area or address. In one implementation, the specification of the geographic area or address may be explicitly identified in the search request. Alternatively, the specification of the geographic area or address may be implied based on a default search area, a displayed map, etc.

In response to the received local search request, business listings matching the received search terms may be identified within a broad geographic area including the specified geographic region (block 310). For example, a search for "auto parts near Bethel Park, PA." may result in identification of business listings matching "auto parts" in geographic regions proximate to, but other than Bethel Park, Pa. Once matching business listings have been identified, a webscore may be determined for each listing (block 320). The web score may be determined as described below with respect to FIG. 5. As will be set forth in additional detail below, each listing's webscore is reflective of the listing's popularity or importance.

Following webscore determination, the identified business listings are ranked based on at least the identified webscores (block 330). The ranked listings are then presented to the user in a set of search results (block 340). By ranking identified business listings using at least a webscore associated with each listing, popular listings proximate to the received geographic area or address may be elevated in presented search results, thereby improving search performance.

In additional implementation consistent with principles of the invention, additional listing features may be applied to webscore or location prominence scores. For example, review scores or sources of reviews associated with the listing may be used to increase or decrease a listing's location prominence score or web score. Alternatively, language included within a review for a listing may also be used to increase or decrease a listing's location prominence score or web score. In yet another embodiment, financial information associated with the listing may be incorporated into the listing's location prominence score or web score determination. For example, information regarding annual sales, employment base, longevity, etc. may be used to adjust a listing's location prominence score or web score. In this manner, local search results may provide the most relevant and helpful information possible.

Figure 4:
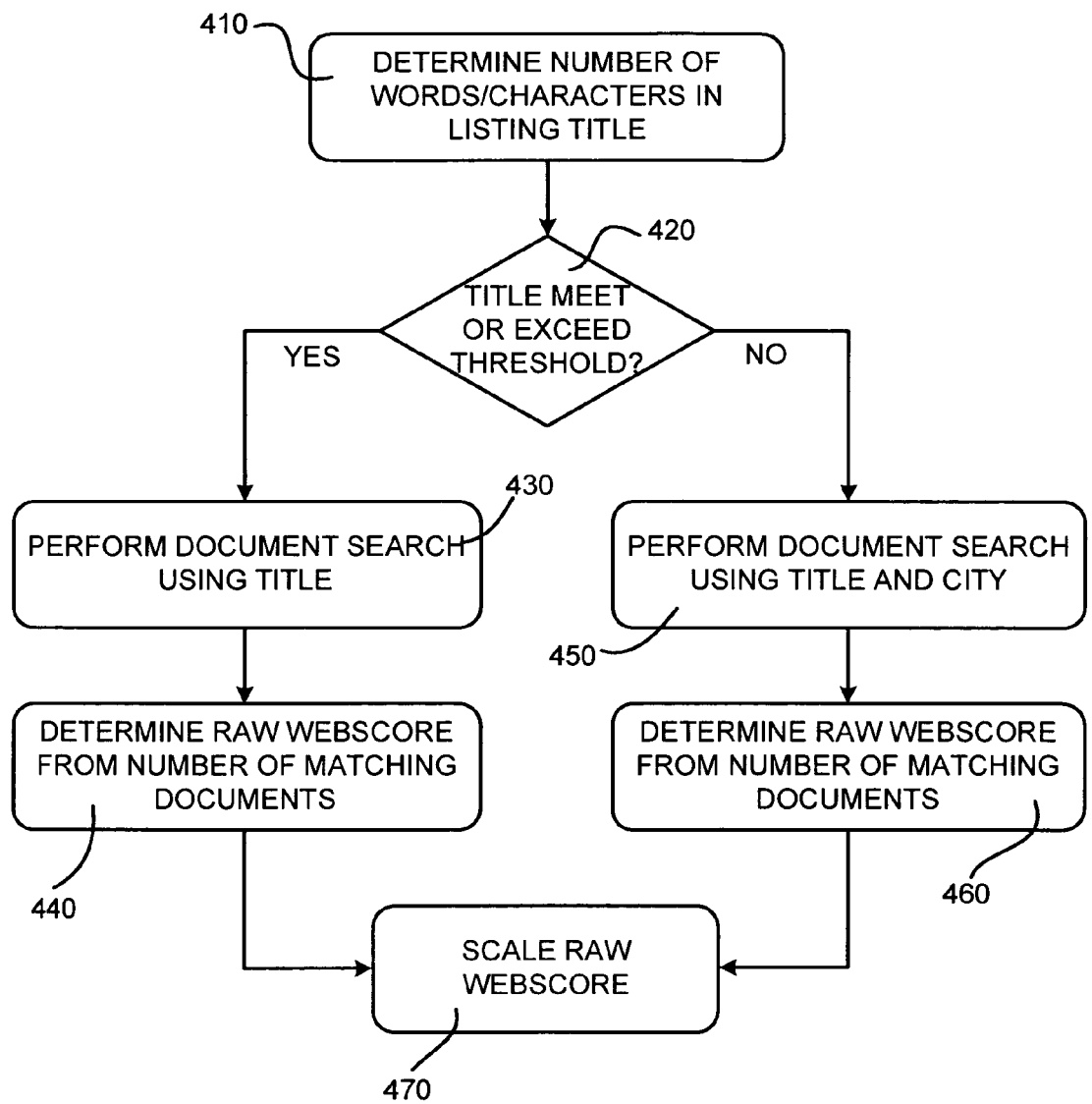
FIG. 4 is a flow chart of exemplary processing for determining a webscore for a business listing in accordance with principles of the invention.

FIG. 4 is a flow chart illustrating exemplary processing for determining a webscore for a business listing. Initially, the number of words or characters in the business listing's title are identified (block 410). Next, it is determined whether the number of words or characters in the listing's title meet or exceed a predetermined threshold (block 420). In one implementation, the predetermined threshold may be three words. Alternatively, a suitable threshold may be 10 characters. Suitable alternative thresholds may also be implemented, without departing from the scope and spirit of the present invention.

If it is determined whether the number of words or characters in the listing's title meet or exceed a predetermined threshold, a document search (e.g., Internet or other web search) may be performed using the listing's title as search terms (block 430). For example, the repository of crawled documents stored at server 220 may be searched using the listing's title as search terms. A number of matching documents returned in the search may then be identified as a raw webscore for the business listing (block 440). For example, a business listing entitled "NAPA Auto Parts" may meet the title length threshold. A subsequently conducted document search may result in 755,000 results. Consequently, the raw webscore for the listing is set to 755,000.

For business listing titles having fewer than the required number of words or characters, a document search (e.g., Internet or other web search) may be performed using a combination of the listing's title and city as search terms (block 450). For example, a business listing entitled "Bill's Tavern" may include fewer than a required number of words or characters. In this instance, an Internet search may be performed for "Bill's Tavern" AND "Bethel Park, PA.". A number of matching documents returned in the search may then be identified as a raw webscore for the business listing (block 460).

Once a raw webscore for the business listing has been identified, the raw webscore may be scaled for inclusion in an additional listing ranking calculation (block 470). In one implementation consistent with principles of the invention, a final webscore may be log 10(raw_webscore)*webscore_weight, where the webscore weight may reflect a relative importance of the webscore to overall business listing ranking. In one embodiment, webscore_weight may be 0.2. It should be understood that the above scaling methodology is exemplary. Other suitable methods for scaling may be similarly employed.

Figure 5:
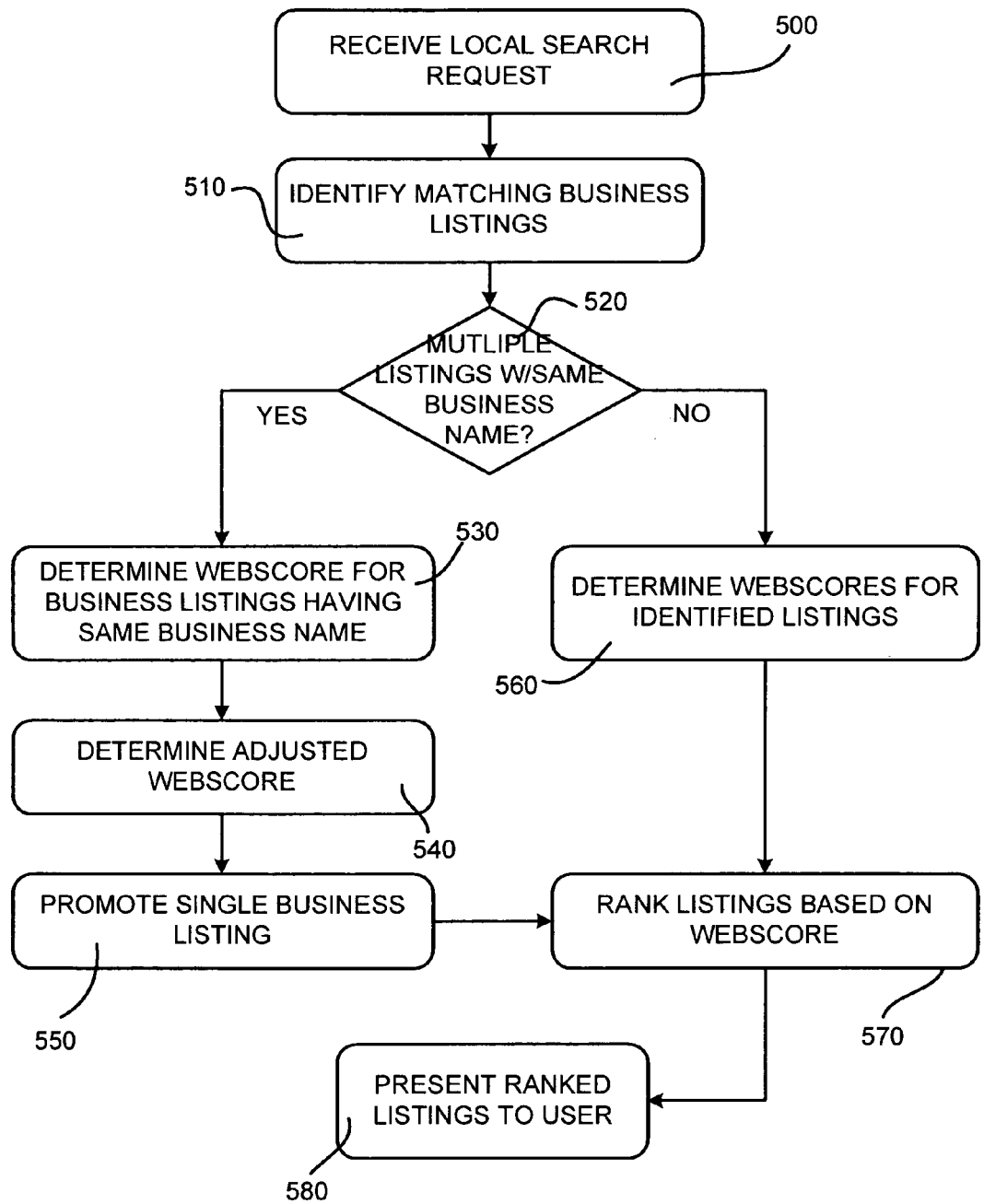
FIG. 5 is a flow chart of exemplary processing for generating webscores for redundant business listings in accordance with principles of the invention.

FIG. 5 is a flow chart illustrating exemplary processing for generating webscores for redundant business listings in accordance with principles of the invention. The processing of FIG. 5 may be contemporaneously performed along with the webscore generation processing described above in FIGS. 3 and 4. Initially, processing may begin by receiving a local search request from client device 110 at local search system 125 (block 500). In response to the received local search request, business listings matching the received search terms may be identified within a broad geographic area including the specified geographic region (block 510). Next, it may be determined whether multiple listings having a same business name are identified (block 520).

If multiple listings having a same business name are identified, a total number of listings having the same business name may be identified (block 530). Next, a webscore for each listing may be determined the manner set forth above in FIG. 4 (block 540). An adjusted webscore may then be determined based on the number of listings having the same business name (block 540). In one implementation consistent with principles of the invention, the webscore for each business listing may be 1/x of the raw webscore determined in block 540, where x is the number of business listings having the same business name. For example, for a given local search, McDonalds may have 10 listings within the broad geographic area associated with the search. Each McDonalds listing may have a webscore of 2,200,000. In accordance with the present embodiment, this raw webscore for each listing may be reduced to 2,200,000/10=220,000.

Following webscore adjustment, a single listing among the number of business listings having the same business name may be promoted above the other listings (block 550). In accordance with principles of the invention, the promoted business listing may be identified by its proximity to the originally received geographic area. Furthermore, the business listing identified for promotion may receive a supplemented webscore commensurate with the level of promotion. Other methods for promoting business listings, such as using review data, sales numbers, etc. may also be used.

If no business listings having the same business name are identified, webscores for the identified business listings may be identified in the manner set forth above with respect to FIG. 4 (block 560). Following adjusted webscore determination and potential promotion for each identified business listing, the identified business listings may be ranked based on at least the identified and possibly adjusted webscores (block 570). The ranked listings may then be presented to the user in a set of search results (block 580).

Figure 6:
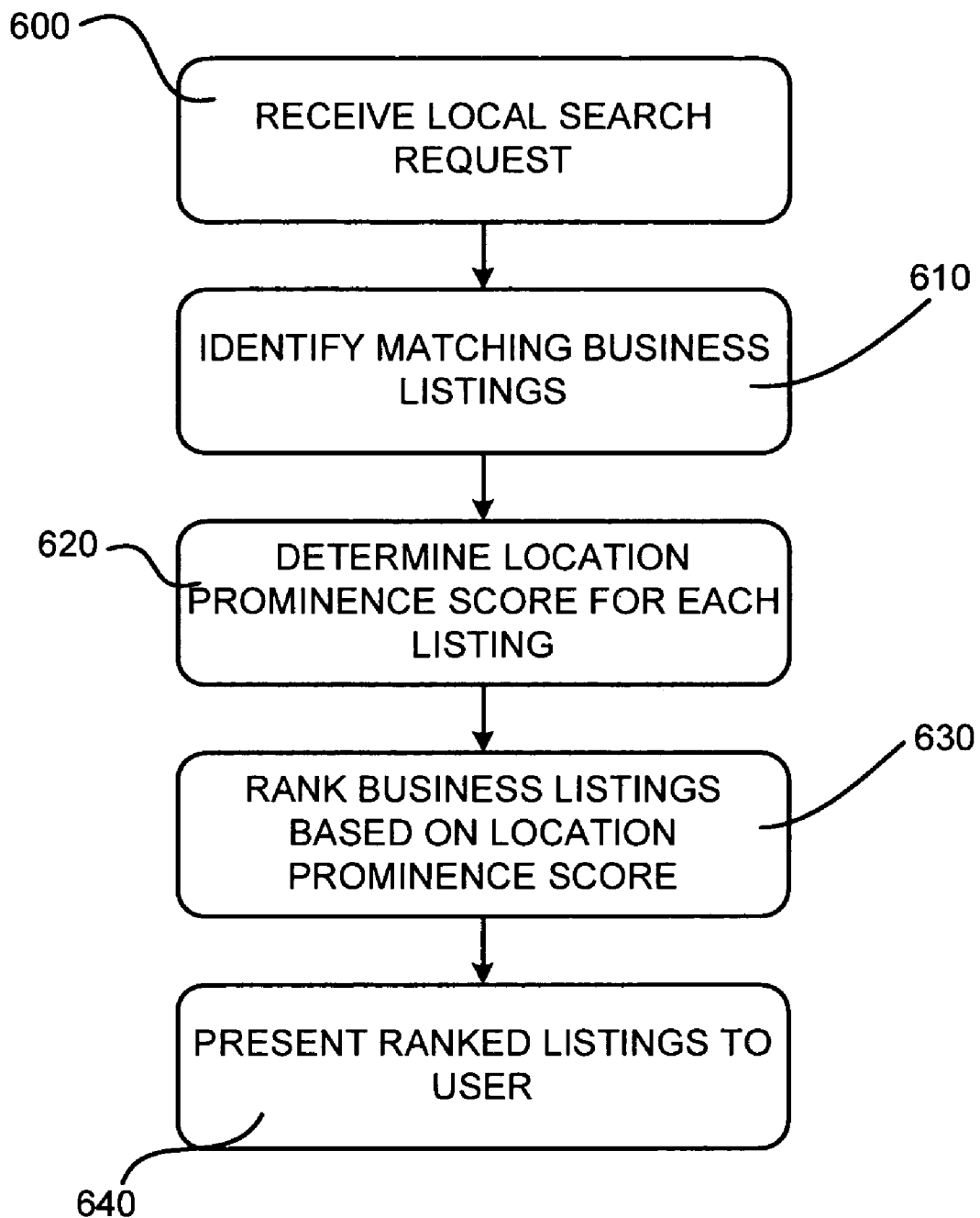
FIG. 6 is a flow chart of exemplary processing for performing a local search in accordance with principles of the invention.

FIG. 6 is a flow chart illustrating alternative processing for performing a local search in accordance with principles of the invention. As described above, processing may begin by receiving a local search request from client 110 at local search system 125 (block 600). In response to the received local search request, business listings matching the received search terms may be identified within a broad geographic area including specified geographic region (block 610). Next, for each identified business listing, a location prominence score may be determined (block 620).

In one implementation consistent with principles of the invention, the location prominence score may be a linear combination of several distinct factors including: a search ranking value for an authority page associated with the business listing; a highest search ranking value for any page referencing the listing address; the number of pages referencing the listing address; the number of scraped page references; the number of reviews for the listing; and the scaled webscore for the listing (as described in detail above). The authority page for the listing refers to the "best" web document identified in association to the listing address. "Search ranking values" refer to web rankings or scores as identified by a search engine. One exemplary search ranking value may be "PageRank" from Google, Inc., although other suitable ranking methodologies may be similarly employed. A "scraped page" refers to a business listing source, such as CitySearch, SuperPages, etc., with the number of references in scraped pages reflecting the popularity of listings associated with the listing address. By generating a location prominence score for each listing, factors such as popularity, and relative location may be incorporated into presented results.

Once a location prominence score has been determined for each business listing, the identified business listings may be ranked based on at least the identified location prominence scores (block 630). The ranked listings may then be presented to the user in a set of search results (block 640).

CONCLUSION

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 3-6, the order of the acts may be modified in other implementations consistent with principles of the invention. Also, non-dependent acts may be performed in parallel. Further, the acts may be modified in other ways.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more processors associated with one or more server devices, the method comprising:
    receiving, at the one or more server devices, a local search request that includes one or more query terms and a geographic identification;
    identifying, by one or more processors associated with the one or more server devices, a local search listing based on the local search request;
    identifying, by one or more processors associated with the one or more server devices, a title associated with the identified local search listing;
    assigning, by by one or more processors associated with the one or more server devices, a webscore for the identified local search listing, where the webscore is determined from a number of search results returned by querying a search engine with the title when a size of the title is greater than a threshold, and the webscore is determined from the number of search results returned by querying the search engine with the title and the geographic identification when the size of the title is less than the threshold;
    ranking, by one or more processors associated with the one or more server devices, the identified local search listing based on the assigned webscore; and
    providing, by the one or more server devices, the ranked identified local search listing.

2. The method of claim 1, further comprising scaling the webscore for the identified local search listing.

3. The method of claim 1, where a number of local search listings having the same title are identified based on the local search request, further comprising:
    adjusting the webscore for at least one of the number of local search listings based on the number of local search listings having the same title.

4. The method of claim 3, where adjusting the webscore for the at least one of the number of local search listings further comprises:
    dividing the number of search results by the number of local search listings having the same title.

5. The method of claim 1, further comprising adjusting the webscore based on one or more of the following:
    a search ranking value for an authority page associated with the identified local search listing;
    a highest search ranking value for any page referencing an address associated with the identified local search listing;
    a number of pages referencing an address associated with the identified local search listing;
    a number of scraped page references of the identified local search listing;
    a number of reviews of the identified local search listing; or
    financial information for the identified local search listing.

6. The method of claim 1, where the size of the title is determined from a number of words in the title.

7. The method of claim 1, where the size of the title is determined from a number of characters in the title.

8. The method of claim 1, further comprising determining the webscore from the number of search results returned by querying the search engine with the title when the size of the title is equal to the threshold.

9. A method performed by one or more processors associated with one or more server devices, the method comprising:
    determining, by the one or more processors associated with the one or more server devices, a webscore for each of a plurality of business listings associated with a location;
    receiving, by a communication interface or an input device associated with the one or more server devices, a local search request over a computer network;
    identifying, by the one or more processors, business listings based on the local search request;
    ranking, by the one or more processors associated with the one or more server devices, the identified business listings based on the webscores determined for the identified business listings; and
    providing, by the communication interface or an output device associated with the one or more server devices, the ranked business listings over the computer network;

where determining the webscore for any one of the plurality of business listings further comprises:
identifying a business listing title; and
determining a number of search results returned by querying a search engine with the business listing title when a size of the business listing title is greater than a threshold, and determining the number of search results returned by querying the search engine with the business listing title and the location associated with the business listing when the size of the business listing title is less than the threshold.

10. The method of claim 9, where a number of the plurality of business listings have the same business listing title, the method further comprising:
adjusting the webscore for at least one of the number of business listings based on the number of business listings having the same business listing title.

11. The method of claim 9, where the size of the business listing title is determined from a number of words in the business listing title.

12. The method of claim 9, where the size of the business listing title is determined from a number of characters in the business listing title.

13. The method of claim 9, further comprising determining the webscore from the number of search results returned by querying the search engine with the title when the size of the business listing title is equal to the threshold.

14. The method of claim 9, where determining the webscore for each of the plurality of business listings further comprises adjusting the webscore for each of the plurality of business listings based on one or more of the following:
a search ranking value for an authority page associated with the business listing;
a highest search ranking value for any page referencing an address associated with the business listing;
a number of pages referencing an address associated with the business listing;
a number of scraped page references of the business listing;
a number of reviews of the business listing; or
financial information for the business listing.

15. A computer program product, tangibly embodied in a computer-readable memory, comprising instructions operable to cause a programmable processor to:
receive a local search request, where the local search request includes a search term and a geographic identifier;
identify a business listing based on the local search request;
identify a title associated with the identified business listing;
determine a webscore for the identified business listing, where the webscore is determined from a number of search results returned by querying a search engine with the title when a size of the title is greater than a threshold, and the webscore is determined from the number of search results returned by querying the search engine with the title and the geographic identifier when the size of the title is not greater than the threshold;
rank the identified business listing based on the assigned webscore; and
provide the ranked identified business listing.

16. A method performed by one or more processors associated with one or more server devices, the method comprising:
receiving, at the one or more server devices, a local search request that includes one or more query terms and a geographic identification;
identifying, by one or more processors associated with the one or more server devices, a local search listing based on the local search request;
retrieving a webscore for the local search listing, where the webscore is based on a number of search results obtained by querying a search engine with a title associated the with local search listing when a size of the title is greater than a threshold, and the webscore is based on the number of search results obtained by querying the search engine with the title and the geographic identification when the size of the title is less than the threshold;
ranking the local search listing based on the retrieved webscore; and
providing the ranked local search listing.

17. The method of claim 16, where the webscore is further based on one of more of the following:
a search ranking value for an authority page associated with the local search listing;
a highest search ranking value for any page referencing an address of the local search listing;
a number of pages referencing an address of the local search listing;
a number of scraped page references;
a number of reviews of the business listing; or
financial information about the local search listing.

18. The method of claim 16, where the size of the title is determined from a number of words in the title.

19. The method of claim 16, where the size of the title is determined from a number of characters in the title.

20. The method of claim 16, further comprising determining the webscore from the number of search results returned by querying the search engine with the title when the size of the title is equal to the threshold.

21. A system comprising:
at least one processor; and
a memory that stores one or more instructions that when executed by the at least one processor, causes the at least one processor to:
receive a local search request that includes one or more query terms and a geographic identification;
identify a local search listing based on the local search request;
identify a title associated with the identified local search listing;
assign a webscore for the identified local search listing, where the webscore is determined from a number of search results returned by querying a search engine with the title when a size of the title is greater than a threshold, and the webscore is determined from the number of search results returned by querying the the search engine with the title and the geographic identification when the size of the title is not greater than the threshold;
rank the identified local search listing based on the webscore; and
provide the ranked local identified search listing.

22. A system comprising:
at least one processor; and
a memory that stores one or more instructions that when executed by the at least one processor, causes the at least one processor to:
determine a webscore for each of a plurality of business listings associated with a location;
receive a local search request over a computer network;
identify business listings based on the local search request;

rank the identified business listings based on the webscores determined for the identified business listings; and provide the ranked business listings over the computer network;

where, when determining the webscore for any one of the plurality of business listings, the at least one processor:

identifies a business listing title; and determines a number of search results returned by querying a search engine with the business listing title when the business listing title is greater than a threshold, and determines the number of search results returned by querying the search engine with the business listing title and the location associated with the business listing when the business listing title is not greater than the threshold.

23. A system comprising:

at least one processor; and a memory that stores one or more instructions that when executed by the at least one processor, causes the at least one processor to:

receive a local search request that includes one or more query terms and a geographic identification;

identify a local search listing based on the local search request;

retrieve a webscore for the local search listing, where the webscore is based on a number of search results obtained by querying a search engine with a title associated with the local search listing when a size of the title is greater than a threshold, and the webscore is based on the number of search results obtained by querying the search engine with the title and the geographic identification when the size of the title is not greater than the threshold;

rank the local search listing based on the retrieved webscore; and provide the ranked local search listing.

* * * * *